Dec. 11, 1928.  1,695,016
M. KRUSE
MEANS FOR HOLDING AND LOCKING SPARE WHEELS
AND THE LIKE ON MOTOR VEHICLES
Filed March 8, 1928    2 Sheets-Sheet 1
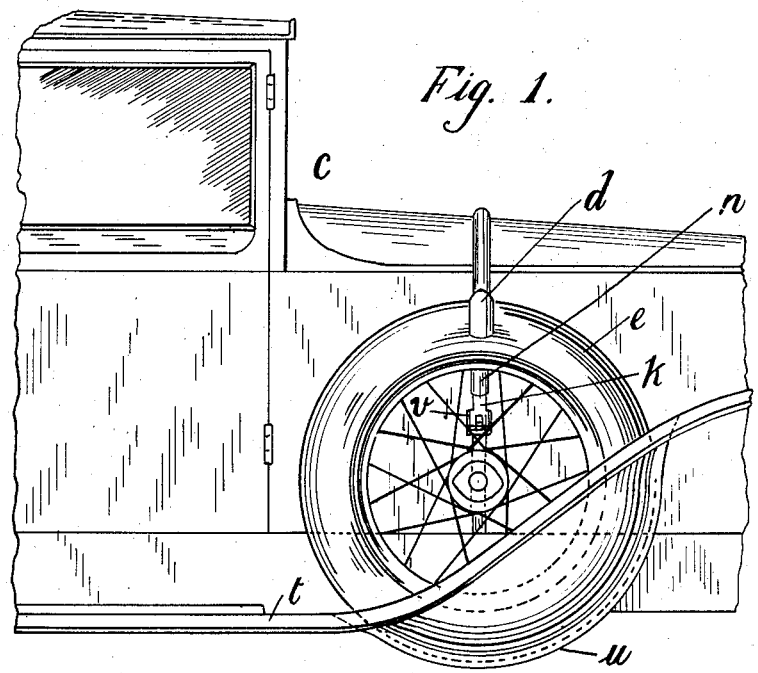
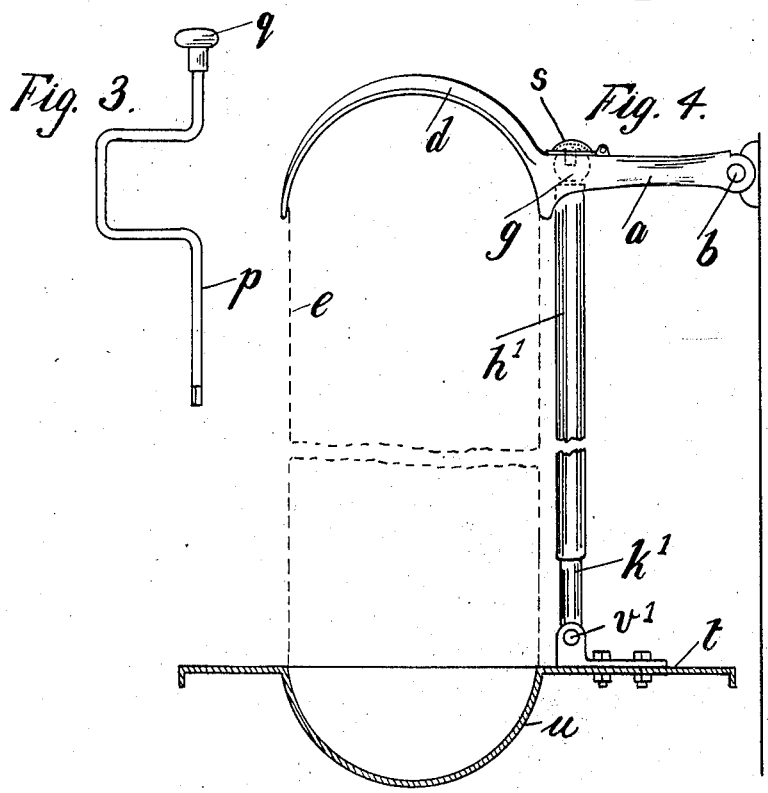
Inventor
Mads Kruse,
By
Atty.

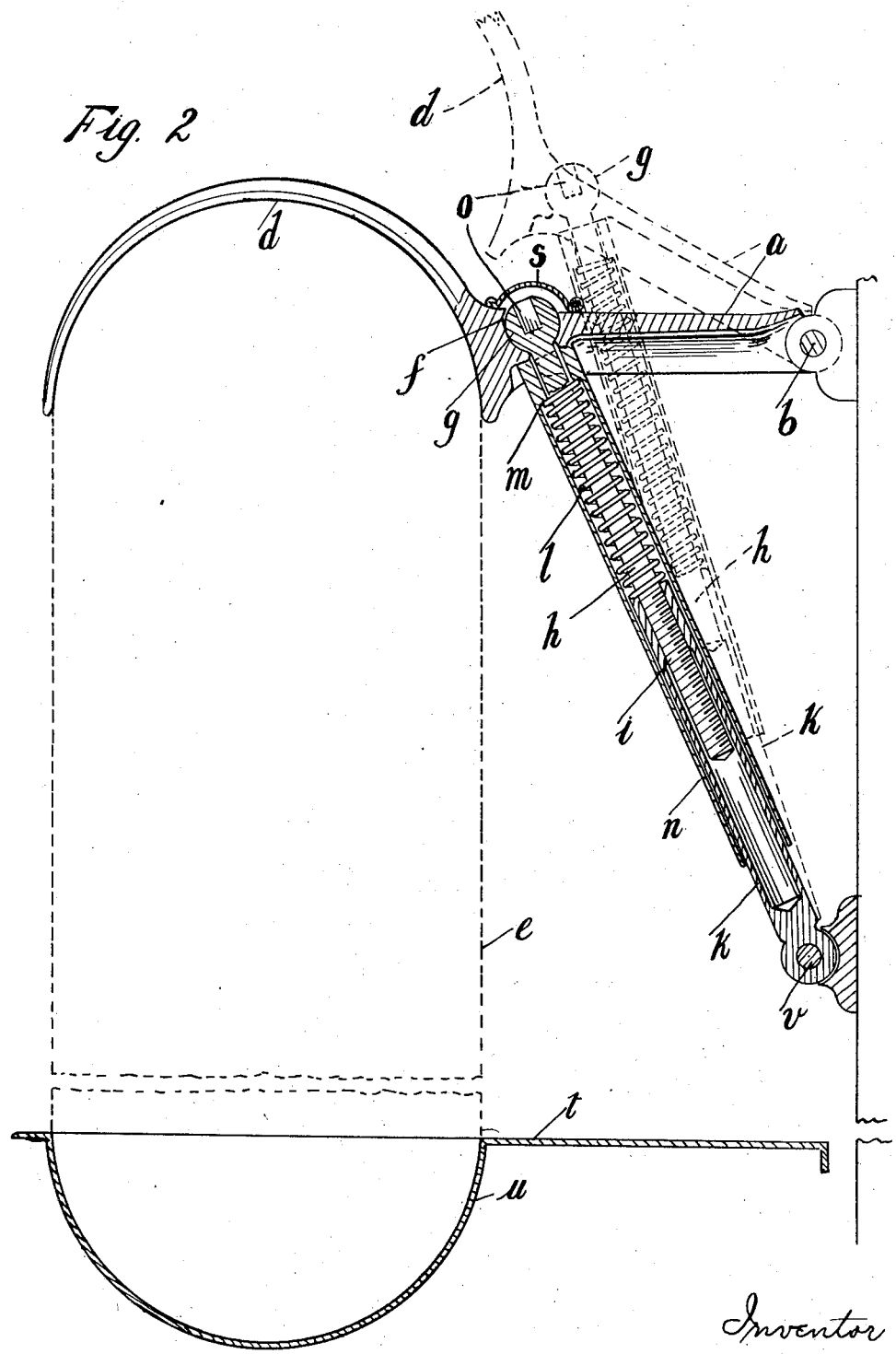

Patented Dec. 11, 1928.

1,695,016

UNITED STATES PATENT OFFICE.

MADS KRUSE, OF LONDON, ENGLAND.

MEANS FOR HOLDING AND LOCKING SPARE WHEELS AND THE LIKE ON MOTOR VEHICLES.

Application filed March 8, 1928, Serial No. 260,070, and in Great Britain March 23, 1927.

This invention relates to improvements in means for holding and locking spare wheels or the like on motor vehicles.

According to this invention, the means for holding and locking a spare wheel or a rim or tire or both in a bed, recess or cradle in or on the running board or its equivalent or other appropriate part on a motor vehicle, comprises a fixed cradle, recess or hook-like member, a telescopic or extensible and contractible stay pivoted at one end to a suitable place on the vehicle or on the running board, means for locking together the members of the telescopic stay, a link, connected at one end to the vehicle and at the other end directly or indirectly to the telescopic stay, and a hook-shaped device, cradle or inverted trough mounted on the link or telescopic stay. The link or lever is suitably pivoted, for example, at one end on the vehicle to the rear of the bonnet and the telescopic or extensible and contractible rod or stay is similarly pivoted at one end on or to the body or framework of the vehicle on the running board and at its other end to the said link. The hook-shaped device, cradle or inverted trough is adapted to partially embrace the tire or rim or both of the wheel and is integral with or connected to the link or the telescopic rod, and means such as a screw and nut are provided for locking together the members of the telescopic rod so as to be inextensible and to cause the hook-shaped device to be fixed while closely embracing the top of the wheel, the bottom of the wheel closely engaging the fixed cradle or recess in the running board or its equivalent. If desired, a spring may be interposed between one of the said telescopic stay-members and the link or between the nut and an inwardly projecting flange of a dust and dirt excluding sleeve outside of the female or tubular stay member for the purpose of raising or assisting in raising the hook shaped device clear of or away from the wheel or the like when the said device is released and so as to assist in increasing the effective length of the telescopic rod or stay.

And in order that the invention may be easily understood and readily carried into effect it will be described with reference to the accompanying drawings in which:—

Figure 1 is a side elevation of part of a motor car provided with one embodiment of the invention and Figure 2 is a transverse section thereof.

Figure 3 is an elevation of a key for locking the spare wheel or rim in position and for unlocking it when required.

Figure 4 is an end elevation of a modification.

According to the construction illustrated by Figures 1 and 2, a shank or link $a$, pivoted at one end at $b$ to a suitable part of the car $c$ say at the rear end of the bonnet is provided at its free end with a hook $d$, more or less semicircular in shape and adapted to embrace the top of the tire of the wheel $e$ or it may be of such a shape as to also embrace the rim of the wheel. The shank or link $a$ is formed with a hole $f$ (Figure 2) near the root of the hook $d$ which hole is part-spherical and forms the socket of a ball-and-socket joint. Resting in this socket is a part-spherical enlargement, knob or ball $g$, formed on or rigidly fixed to a rod $h$ which is screw-threaded at its free end, the screw-threaded portion engaging in a nut $i$ formed at or near the top of the tubular stay member $k$, the lower end of which is pivoted to the car below the pivot of the link or hooked shank $a$. Above the nut $i$, surrounding the rod $h$ and within the tubular stay $k$ is a coil-spring $l$, one end of which bears against the nut $i$ while the other end presses against an inwardly projecting flange $m$ at the top of a protecting sleeve $n$. This sleeve surrounds the tubular member $k$ of the telescopic rod and the rod $h$ projecting therefrom and abuts at its upper end against the shank or link $a$ below the ball and socket joint, or against a collar or enlargement on the rod below the ball. The ball $g$ is formed with a hole $o$ of square or other cross-section to receive a key $p$ (Figure 3) which is preferably provided with a lever handle $q$ by which the rod may be turned to lower the hook or allow the latter to rise. In the example shown, the key $p$ is provided with a brace-like handle to obtain the necessary leverage. The spring $l$, serves to raise the hook $d$ as the rod $h$ is unscrewed so that the wheel $e$ may be removed from or inserted in the holder without having to exert any force to lift the hook by hand. In this construction, the hook, on being raised, passes through the arc of a circle and also recedes from the plane of the spare wheel in a direction towards the car. In order to keep rain or foreign bodies out of the recess or hole for the key, the shank or link may be provided with a hinged cap $s$ and similarly the spring *l*, the screw *h* and the nut *i* are protected by the sleeve *n*, which is slidable on the tubular stay-member *k*. The running board or wing *t* is conveniently provided with a trough *u* of ordinary construction to receive the tire, or the bottom of the wheel *e* or both as usual.

If desired and as shown in Figure 4, the telescopic rod marked *h' k'* may be made somewhat longer and pivoted at its lower end at *v'* to the running board or wing *t* also furnished with a trough *u* to receive the wheel *e*.

Obviously, the device may be so fashioned or constructed as to hold more than one spare wheel or rim with tire and in the event of there being two spare wheels or the like, these are arranged in planes parallel to each other and the hooks or the like and the well if any, in the running board or wing are extended, made wider or duplicated.

Although each of the constructions described and illustrated is provided with a protecting sleeve, it will be evident that the latter may be dispensed with if the positions of the telescopic stay members be reversed, that is to say the screw threaded rod is then pivoted at the bottom to the running board or other suitable part of the car and the tubular stay member (with the nut) is connected by the link at or near its upper end to the car and is furthermore provided with means for being engaged by the key.

I claim:—

1. Means for holding and locking a spare wheel or a wheel-rim or felly and tire on a motor vehicle including in combination a relatively immovable retaining device mounted on a part of the vehicle and adapted to receive, partially embrace and retain in position a segment of the wheel-rim and tire, a link pivotally mounted at one end on a part of the vehicle, a second retaining device extending from and beyond the free end of the said link, and adapted to receive, partially embrace and retain a second segment of the wheel rim and tire approximately opposite to the first mentioned segment of the wheel rim and tire, an extensible and contractible stay, pivoted at one end to a part of the vehicle and connected at its other end to the free end of the said link and means for rendering the said stay inextensible, substantially as set forth.

2. Means for holding and locking a spare wheel or a wheel rim or felly and tire on a motor vehicle including in combination a relatively immovable retaining device mounted on a part of the vehicle and adapted to receive, partially embrace and retain in position a segment of the wheel rim and tire, a link pivotally mounted at one end on a part of the vehicle, a second retaining device integral with and extending beyond the free end of the said link, and adapted to receive, partially embrace and retain a second segment of the wheel rim and tire approximately opposite to the first mentioned segment, an extensible and contractible stay, pivoted at one end to a part of the vehicle and connected at its other end to the free end of the said link and means for rendering the said stay inextensible, substantially as set forth.

3. Means for holding and locking a spare wheel or a wheel rim or felly and tire on a motor vehicle comprising, in combination, a relatively immovable retaining device mounted on a part of the vehicle and adapted to receive, partially embrace and hold in position a segment of the wheel-rim and tire, a link pivotally mounted at one end on a part of the vehicle, a hook extending beyond and integral with the free end of the said link and adapted to partially embrace a second segment of the wheel-rim and tire approximately opposite to the first mentioned segment of the wheel rim and tire, an extensible and contractible stay pivoted at one end to a part of the vehicle and connected at its other end to the free end of the said link and means for rendering the said stay inextensible substantially as set forth.

4. Means for holding and locking a spare wheel or a wheel-rim or felly and tire on a motor vehicle comprising, in combination a relatively immovable retaining device mounted on a part of the vehicle and adapted to receive, partially embrace and hold in position a segment of the wheel-rim and tire, a link pivotally mounted at one end on a part of the vehicle, an extensible and contractible stay pivoted at one end to a part of the vehicle, means for rendering the said stay inextensible, and a hook located at the upper end of the said stay and adapted to partially embrace a segment of the wheel-rim and tire, the link, the free end of the extensible and contractible stay and the hook being connected together substantially as set forth.

5. Means for holding and locking a spare wheel on a motor vehicle comprising, in combination a trough extending from the running board of the vehicle and adapted to receive a segment of the wheel rim and tire, an extensible and contractible stay pivoted at one end to a suitable part on the vehicle, means for locking together the members of the extensible and contractible stay, a link pivotally connected at one end to another part of the vehicle and at the other end to the free end of the said stay and a hook located at the free end of the said link and adapted to partially embrace a segment of the wheel-rim and tire approximately opposite to the said trough, substantially as set forth.

6. Means for holding and locking a spare wheel on a motor vehicle comprising, in combination, a trough on the vehicle adapted to receive a segment of the wheel-rim and tire, a telescopic stay of which one member is screw threaded externally and the other member is provided with a nut in which the screw engages, the said stay pivotally connected at its lower end to a part of the vehicle and provided at its upper end with means for enabling the screw to be turned in the nut, a key for turning the screw, a link pivotally connected at one end to a part of the vehicle and at the free end pivotally connected to the free end of the said stay and a hook located at the free end of the said link and adapted to partially embrace a segment of the wheel-rim and tire approximately opposite to the said trough, substantially as set forth.

7. Means for holding and locking a spare wheel on a motor vehicle comprising, in combination, a trough on the vehicle adapted to receive a segment of the wheel-rim and tire; a telescopic stay, the male member of said stay screw-threaded externally to form a screw and the female member provided with a nut in which the said screw engages, the said stay pivotally connected at its lower end to a part of the vehicle and provided at its upper end with a knob furnished with means for engagement with a key to cause the said screw to be turned in the nut, the said key, a link, pivotally connected at one end to a part of the vehicle and at the free end provided with an aperture to receive the stay and a part-spherical socket in which the said knob is seated, a coil spring surrounding the male stay member, resting on the top of the nut of the female stay member and elastic means tending to raise the link and a hook located at the free end of the link and adapted to partially embrace a segment of the wheel-rim and tire approximately opposite to the said trough, substantially as set forth.

8. Means for holding and locking a spare wheel on a motor vehicle comprising in combination, a trough on the vehicle adapted to receive a segment of the wheel-rim and tire, a telescopic stay, the male member of said stay screw-threaded externally to form a screw and the female member provided internally with a nut in which the said screw engages, the said stay pivotally connected at its lower end to a part of the vehicle and provided at its upper end with a knob furnished with means for engagement with a key to cause the said screw to be turned in the nut, the said key, a link pivotally connected at one end to a part of the vehicle and at the free end provided with an aperture to receive the stay and a part-spherical socket in which the said knob is seated, a coil spring surrounding the male stay-member resting on the top of the nut of the female stay member and adapted to support the said link and a hook located at the free end of the link and adapted to partially embrace a segment of the wheel rim and tire approximately opposite to the said trough substantially as set forth.

9. Means for holding and locking a spare wheel on a motor vehicle comprising, in combination, a trough on the vehicle adapted to receive a segment of the wheel-rim and tire, a telescopic stay, the male member of said stay screw-threaded externally to form a screw and provided at its upper end with a knob furnished with means for being engaged by a key the said key, the female member of the said stay provided internally with a nut in which the said screw engages and pivotally connected at its lower end to a part of the vehicle, a link pivotally connected at one end to a part of the vehicle and at its free end perforated to receive the male member of the stay and provided with a part-spherical socket around the perforation to form a seating for the knob at the top of the male stay member, a hook extending from the free end of the link to partially embrace a segment of the wheel rim and tire, a protecting sleeve surrounding the female stay member and furnished at the top with an inwardly projecting flange adapted to engage the lower side of the part-spherical socket of the said link and a coil-spring surrounding the male-stay member, resting at one end on the top of the nut of the female stay member and tending at its other end to force upwards the inwardly projecting flange of the protecting sleeve and the said link, substantially as set forth.

10. Means for holding and locking a spare wheel on a motor vehicle comprising in combination, a trough on the vehicle adapted to receive and hold a segment of the wheel-rim and tire, a telescopic stay, the male member of said stay screw-threaded externally to form a screw, provided at its upper end with a knob and a shaped recess in said knob for being engaged by a key, the said key, the female member of the said stay, provided internally with a nut in which the said screw engages and pivotally connected at its lower end to a part of the vehicle, a link pivotally connected at one end to a part of the vehicle and at its free end perforated to receive the male member of the stay, provided with a part spherical socket around the perforation to form a seating for the knob at the top of the male stay member, a cover adapted to cover and uncover the said knob, a hook extending from the free end of the link to partially embrace a segment of the wheel rim and tire, a sleeve surrounding the female stay-member and furnished at the top with an inwardly projecting flange adapted to engage the lower side of the part-spherical socket of the said link and a coil-spring surrounding the male stay-member resting at one end on the top of the nut of the female stay-member and tending at its other end to force the said protecting sleeve and the link upwards, substantially as set forth.

11. Means for holding and locking a spare wheel on a motor vehicle comprising, in combination, a trough extending from the running board and adapted to receive a segment of the wheel-rim and tire, a telescopic stay, the male member of said stay screw-threaded externally to form a screw, provided at its upper end with a part-spherical knob and a shaped recess in said knob for being engaged by a key, the said key, the female member of the said stay provided internally with a nut in which the said screw engages and pivotally connected at its lower end to a part of the vehicle, a link pivotally connected at one end to a part of the vehicle and at its free end perforated to receive the male member of the stay, provided with a part-spherical socket above and concentric with the perforation to form a seating for the knob at the top of the male stay-member, a cover adapted to cover and uncover the said knob, a hook extending from the free end of the link to partially embrace a segment of the wheel-rim and tire, a sleeve surrounding the female stay member and furnished at the top with an inwardly projecting flange adapted to engage the lower side of the part-spherical socket of the said link and a coil-spring surrounding the male stay-member resting at its lower end on top of the nut of the female stay-member and engaging at its upper end the inwardly projecting flange of the protecting sleeve, substantially as set forth.

MADS KRUSE.